US012493266B2

(12) United States Patent
Wharton

(10) Patent No.: US 12,493,266 B2
(45) Date of Patent: Dec. 9, 2025

(54) THREE-DIMENSIONAL KARUSSEL- OR TOURBILLON-TYPE REGULATING MEMBER PROVIDED WITH A PERIPHERAL BALL BEARING

(71) Applicant: Blancpain SA, Le Brassus (CH)

(72) Inventor: Kadmiel Wharton, L'Isle (CH)

(73) Assignee: Blancpain SA, Le Brassus (CH)

( * ) Notice: Subject to any disclaimer, the term of this patent is extended or adjusted under 35 U.S.C. 154(b) by 348 days.

(21) Appl. No.: 18/193,906

(22) Filed: Mar. 31, 2023

(65) Prior Publication Data

US 2023/0341817 A1 Oct. 26, 2023

(30) Foreign Application Priority Data

Apr. 22, 2022 (EP) .................................... 22169526

(51) Int. Cl.

| | |
|---|---|
| ***G04B 17/28*** | (2006.01) |
| ***G04B 15/14*** | (2006.01) |
| ***G04B 31/00*** | (2006.01) |

(52) U.S. Cl.

CPC ........... *G04B 17/285* (2013.01); *G04B 15/14* (2013.01); *G04B 31/00* (2013.01)

(58) Field of Classification Search

CPC ...... G04B 17/285; G04B 15/14; G04B 31/00; G04B 17/025; G04B 27/004

See application file for complete search history.

(56) References Cited

U.S. PATENT DOCUMENTS

| | | | | |
|---|---|---|---|---|
| 10,481,557 B2* | 11/2019 | Mutrux | ................ | G04B 17/285 |
| 11,586,147 B2* | 2/2023 | Feyer | ................... | G04B 27/004 |
| 2007/0041276 A1* | 2/2007 | Jansen | ................. | G04B 17/285 368/127 |

FOREIGN PATENT DOCUMENTS

| | | |
|---|---|---|
| CH | 7965 A | 1/1894 |
| CH | 705 039 A2 | 11/2012 |
| CH | 711 417 A2 | 2/2017 |

(Continued)

OTHER PUBLICATIONS

Japanese Office Action issued May 21, 2024 in corresponding Japanese Patent Application No. 2023-066180 (with English translation). The reference cited was previously filed on a Form PTO-1449 on Mar. 31, 2023, 9 pages.

(Continued)

*Primary Examiner* — Edwin A. Leon

(74) *Attorney, Agent, or Firm* — Oblon, McClelland, Maier & Neustadt, L.L.P.

(57) ABSTRACT

A three-dimensional karussel- or tourbillon-type regulating member for a horological movement, the regulating member including a drive device provided with a barrel and a gear train, the regulating member including an inertial mass, elastic return device for the inertial mass, an escapement mechanism, an inner carriage capable of moving in rotation about a first axis of rotation, and an outer carriage capable of moving in rotation about a second axis of rotation, the inner carriage being housed inside the outer carriage, the inner carriage carrying the inertial mass, the elastic return device for the inertial mass and the escapement mechanism, and including a first ball bearing arranged to enable the outer carriage to rotate in the horological movement, with the first ball bearing being arranged at the periphery of the outer carriage.

18 Claims, 8 Drawing Sheets

(56) References Cited

FOREIGN PATENT DOCUMENTS

| | | | |
|---|---|---|---|
| CH | 709 098 | B1 | 6/2018 |
| WO | WO 2005/071498 | A1 | 8/2005 |

OTHER PUBLICATIONS

European Search Report Issued Aug. 30, 2022 in European Application 22169526.5 Filed on Apr. 22, 2022 (with English Translation of Categories of Cited Documents), 3 pages.

* cited by examiner

THREE-DIMENSIONAL KARUSSEL- OR TOURBILLON-TYPE REGULATING MEMBER PROVIDED WITH A PERIPHERAL BALL BEARING

CROSS-REFERENCE TO RELATED APPLICATION

This application claims priority to European Patent Application No. 22169526.5 filed on Apr. 22, 2022, the entire disclosure of which is hereby incorporated herein by reference.

TECHNICAL FIELD OF THE INVENTION

The invention relates to the field of three-dimensional tourbillon- or karussel-type regulating members for a horological movement.

TECHNOLOGICAL BACKGROUND

Most mechanical watches today are equipped with regulating members comprising a sprung balance and a Swiss lever escapement mechanism. The sprung balance constitutes the time base of the watch. It is also referred to as a resonator.

The escapement has two main functions:

to maintain the two-and-fro motions of the resonator;

to count these to-and-fro motions.

An inertial mass, a guide and an elastic return element are required in order to constitute a mechanical resonator. Conventionally, a balance spring acts as an elastic return element for the inertial mass constituted, for example, by a balance. This balance is guided in rotation by pivots which rotate inside plain ruby bearings.

In order to reduce the undesirable effects of gravity on the motion of the regulating member, complications of the tourbillon or karussel type have been developed, so as to cause the regulating member assembly to rotate about an axis of rotation. The regulating member is arranged in a rotating carriage, which rotates continuously around the axis of rotation. These complications also have a particular aesthetic appeal, which makes the timepiece singularly attractive.

In a tourbillon, the escapement mechanism and the carriage rotation mechanism are arranged in series. Generally speaking, the means for driving the movement actuate the rotation of the carriage, and the rotation of the carriage in turn causes the escapement mechanism to be actuated. The escapement mechanism meshes with a fixed wheel of the movement in order to be actuated.

A karussel works differently, as the actuation of the carriage rotation and the actuation of the escapement mechanism are produced in parallel by the drive means. The two motions are independent of one another. Thus, unlike the tourbillon, the rotation of the carriage can occur even if the escapement mechanism is blocked.

To prevent the carriage from idling when unloading the barrel, the karussel comprises a retaining gear train, which blocks the carriage if the escapement mechanism is blocked.

In order to further improve the precision of the regulating member in relation to gravity, three-dimensional tourbillons have been developed. Such tourbillons include at least two carriages rotating about at least two axes of rotation, preferably perpendicular to one another.

Typically, the rotation of the one or more carriages is actuated via gear trains in connection with the means for driving the movement, which, for example, mesh with an axial staff located beneath the carriage. Regulating members provided with a peripheral carriage toothing also exist, the toothing allowing the rotation of the carriage to be actuated by the driving means.

The axial staff is typically mounted in bearings in order to rotate. However, in some examples, the axial staff of the carriage is mounted on a ball bearing, in particular for some karussels.

The current configurations of this type of regulating members are thus relatively limited, and there are few alternatives to these examples.

SUMMARY OF THE INVENTION

The purpose of the invention is to overcome the aforementioned drawbacks, and aims to provide a horological movement comprising a three-dimensional regulating member that has a new configuration.

To this end, the invention relates to a three-dimensional karussel- or tourbillon-type regulating member for a horological movement, the regulating member comprising drive means provided with a barrel and a gear train, said regulating member including an inertial mass, elastic return means for the inertial mass, an escapement mechanism, an inner carriage capable of moving in rotation about a first axis of rotation, and an outer carriage capable of moving in rotation about a second axis of rotation, the inner carriage being housed inside the outer carriage, the inner carriage carrying the inertial mass, the elastic return means for the inertial mass and the escapement mechanism.

The regulating member is noteworthy in that it comprises a first ball bearing arranged to enable the outer carriage to rotate in the horological movement, with the first ball bearing being arranged at the periphery of the outer carriage.

Thus, by having a ball bearing at the periphery of the carriage, there is no longer a need to position it on the staff beneath the carriage, and the staff can be omitted or only used to actuate the escapement mechanism.

Thanks to the invention, new configurations can be obtained for the three-dimensional regulating member, such as a three-dimensional karussel, or for example, to improve compactness, in particular by reducing the height of the regulating member.

According to one specific embodiment of the invention, the regulating member is a three-dimensional karussel, the drive means being configured to actuate the rotational motion of the outer carriage in parallel with the rotational motion of the inner carriage, a first part of the torque provided by the drive means being transmitted to the outer carriage, and a second part of the torque being transmitted to the inner carriage.

According to one specific embodiment of the invention, the drive means are further configured to actuate the escapement mechanism in parallel with the rotational motion of the outer carriage and in parallel with the rotational motion of the inner carriage, with a third part of the torque provided by the drive means being transmitted to the escapement mechanism.

According to one specific embodiment of the invention, the drive means comprise a seconds driving crown arranged around the second axis of rotation of the outer carriage, preferably around the outer carriage, the seconds driving crown being configured to transmit, in parallel, to the outer and inner carriages, the first and second part of the torque provided by the drive means.

According to one specific embodiment of the invention, the rotation of the seconds driving crown also causes the escapement mechanism to be actuated in parallel with the rotations of the outer carriage and of the inner carriage.

According to one specific embodiment of the invention, the regulating member comprises a carriage driving wheel set carried by the outer carriage or the inner carriage, the carriage driving wheel set being free to rotate relative to the outer and inner carriages, the rotation of the carriage driving wheel set actuating the escapement mechanism and the rotational motion of the inner carriage in parallel.

According to one specific embodiment of the invention, the seconds driving crown meshes with the carriage driving wheel set.

According to one specific embodiment of the invention, the escapement mechanism includes an escape wheel, an escape pinion and an intermediate wheel meshing with the escape pinion, the carriage driving wheel set meshing with the intermediate wheel of the escapement mechanism.

According to one specific embodiment of the invention, the regulating member comprises first gear trains for retaining the inner carriage, the first retaining gear trains being arranged within the inner carriage so as to mesh with the intermediate wheel of the escapement mechanism and a wheel integral with the outer carriage, in order to prevent the inner carriage from rotating at an excessive speed.

According to one specific embodiment of the invention, the regulating member comprises second gear trains for retaining the outer carriage, the second retaining gear trains being arranged outside the outer carriage so as to mesh with the seconds driving crown and with the outer carriage, in order to prevent the outer carriage from rotating at an excessive speed.

According to one specific embodiment of the invention, the seconds driving crown comprises two toothings, a first toothing meshing with the carriage driving wheel set, and a second toothing meshing with the second retaining gear trains.

According to one specific embodiment of the invention, the regulating member comprises a second ball bearing arranged to enable the seconds driving crown to rotate.

According to one specific embodiment of the invention, the outer carriage comprises an annular upper part and an annular lower part rigidly connected to one another, the annular upper part supporting the inner carriage by at least one bearing, preferably two bearings, the lower part being provided with an outer toothing.

According to one specific embodiment of the invention, the inner carriage comprises an upper support and a lower support, with the inertial mass, the elastic return means for the inertial mass and the escapement mechanism being suspended between the upper support and the lower support.

According to one specific embodiment of the invention, the rotational speed of the inner carriage is greater than the rotational speed of the outer carriage.

According to one specific embodiment of the invention, the first axis of rotation is substantially perpendicular to the second axis of rotation.

The invention further relates to a horological movement including such a regulating member.

BRIEF DESCRIPTION OF THE FIGURES

The purposes, advantages and features of the present invention will become apparent after reading several embodiments, which are provided for purposes of illustration only and not intended to limit the scope of the invention, given with reference to the accompanying drawings, wherein.

DETAILED DESCRIPTION OF THE INVENTION

The invention relates to a three-dimensional karussel- or tourbillon-type regulating member and a horological movement 10 comprising such a regulating member.

In the description below, the regulating member is a three-dimensional karussel 1.

The horological movement 10 comprises a plate (not shown in the figures), which preferably extends substantially in one plane, the plate being configured to support parts of the movement 10.

Figure 1:
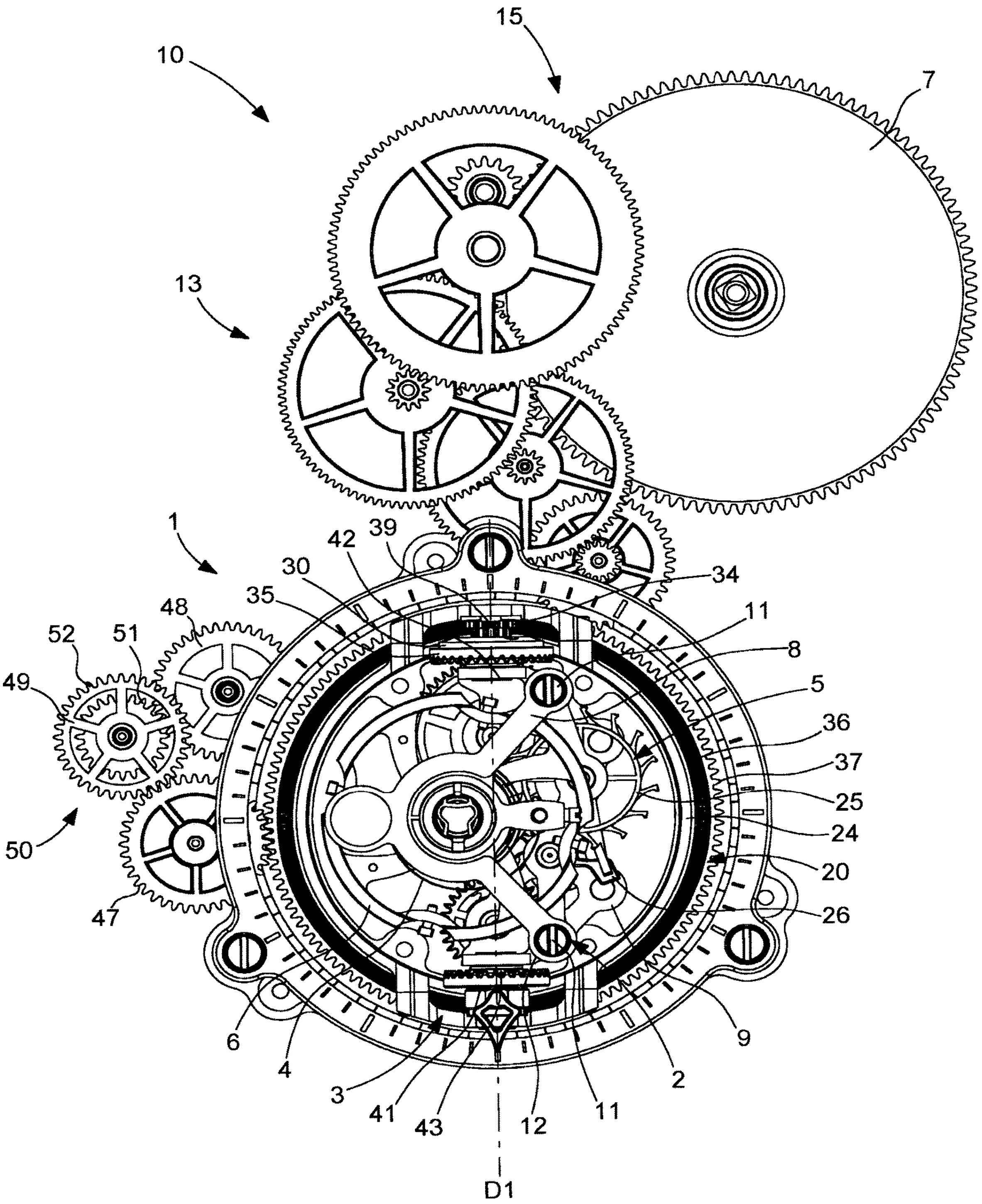
FIG. 1 diagrammatically shows a top view of a part of a horological movement comprising a regulating member according to the invention, FIG. 2 diagrammatically shows a perspective view of the part of the horological movement in FIG. 1, FIG. 3 diagrammatically shows a perspective, top view of a part of the regulating member according to the invention, FIG. 4 diagrammatically shows a perspective bottom view of a part of the regulating member according to the invention, FIG. 5 diagrammatically shows a top view of a part of the regulating member according to the invention, FIG. 6 diagrammatically shows a perspective, top view of a part of the regulating member according to the invention, FIG. 7 diagrammatically shows a perspective, top view of a part of the regulating member according to the invention, and FIG. 8 diagrammatically shows a perspective, top view of the outer carriage of the regulating member according to the invention.
Figure 2:
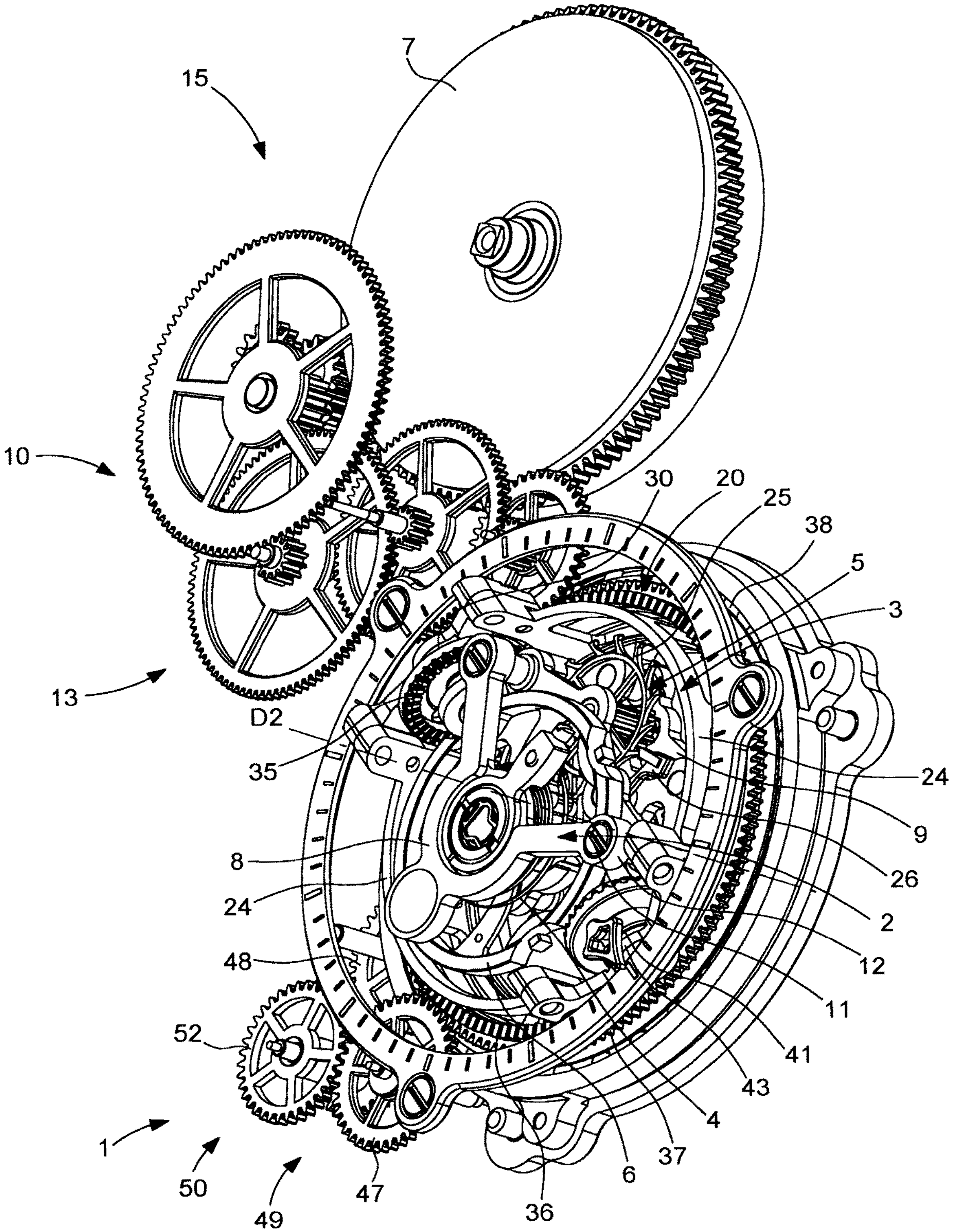
Figure 3:
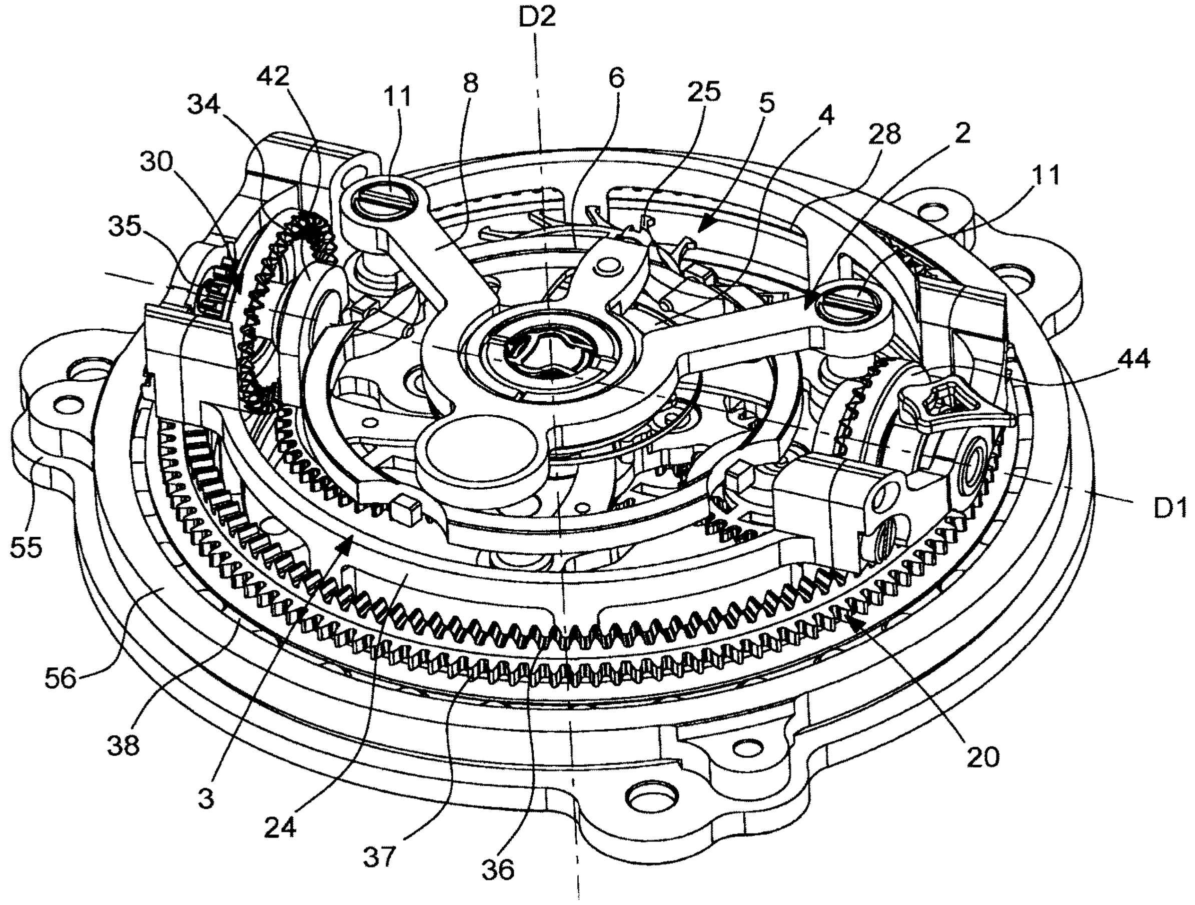
Figure 4:
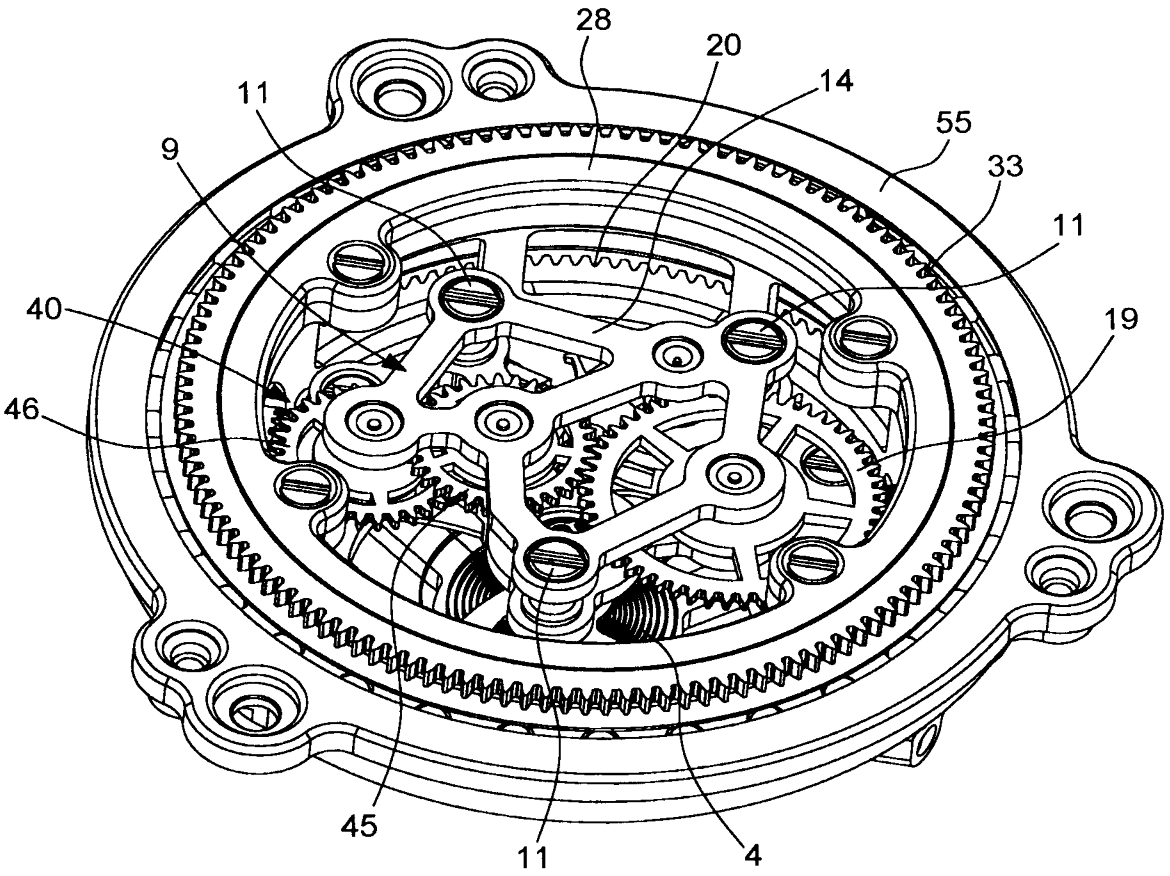
Figure 5:
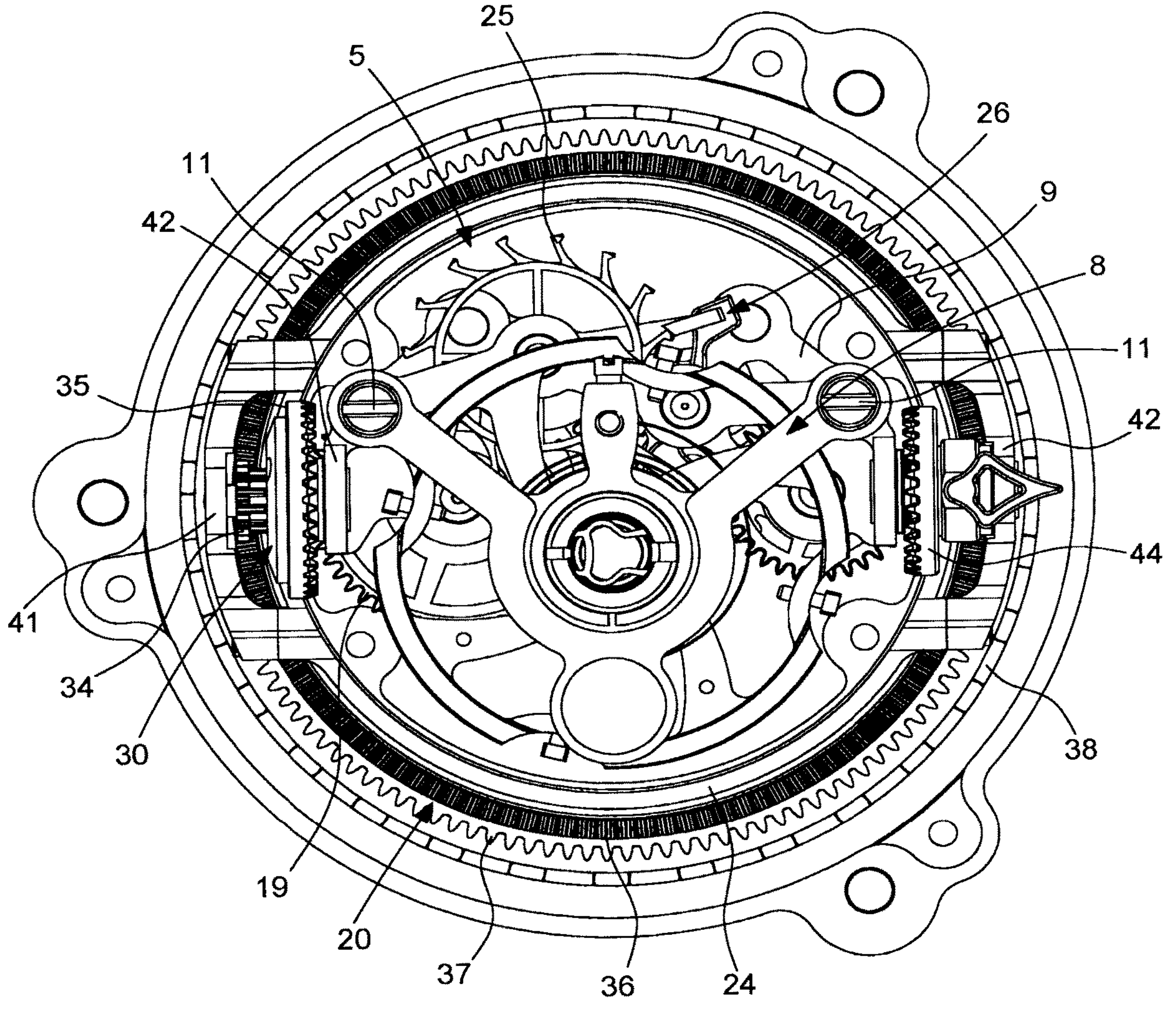
Figure 6:
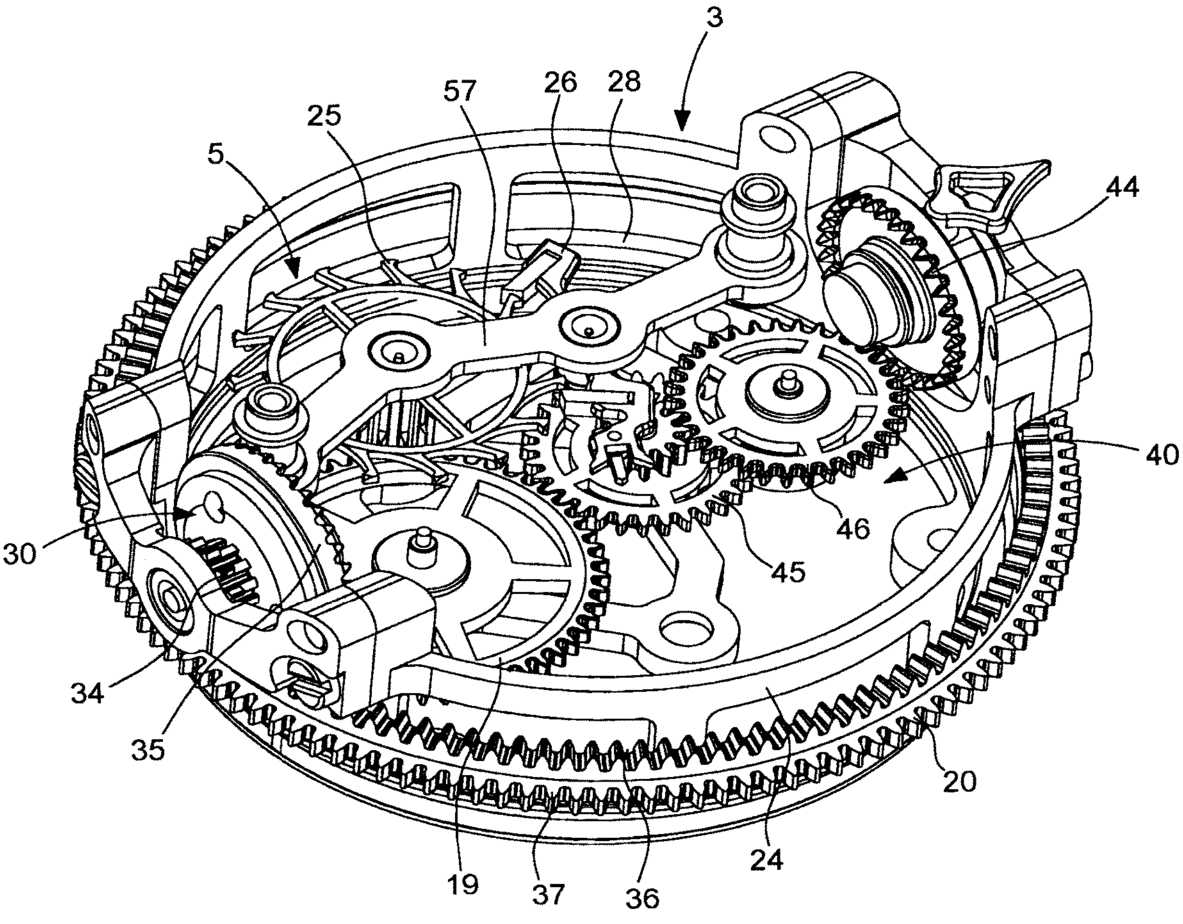
Figure 7:
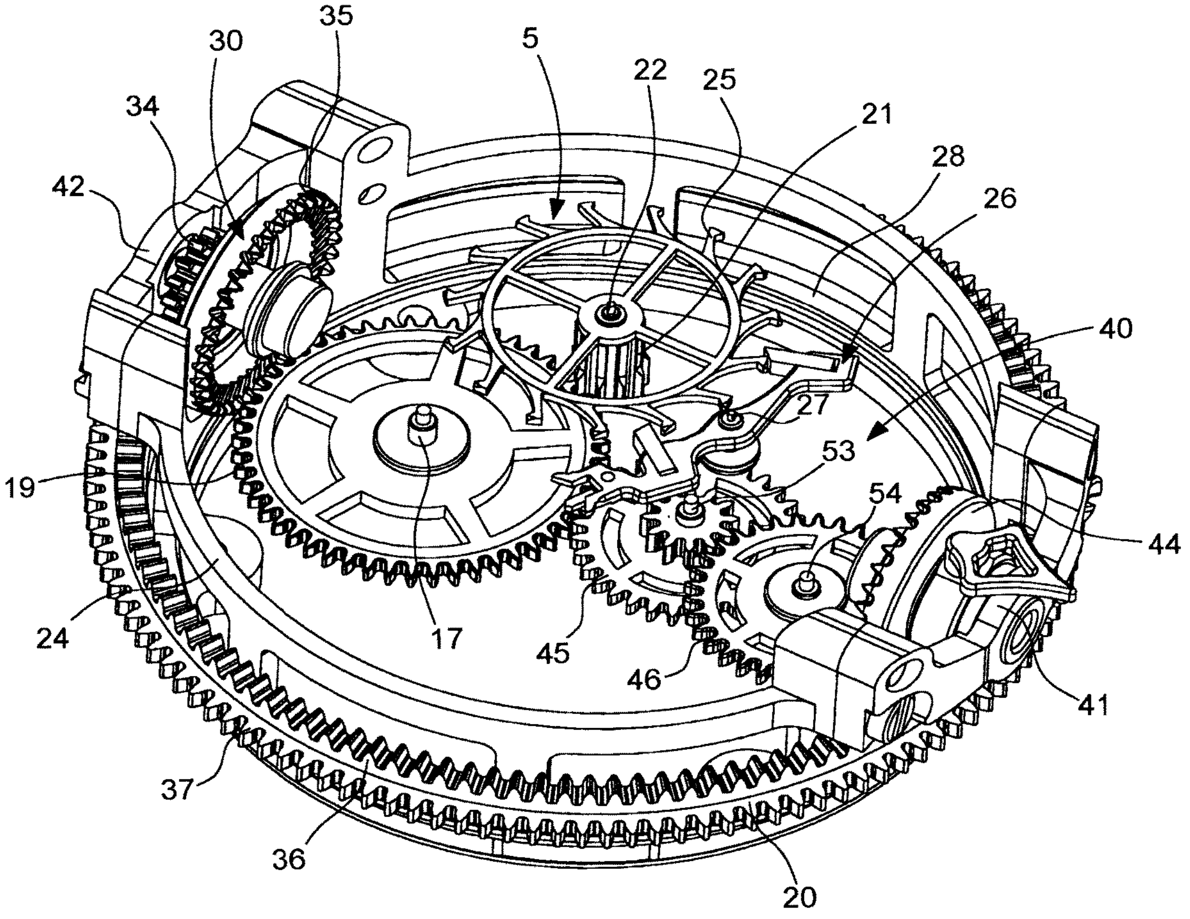
Figure 8:
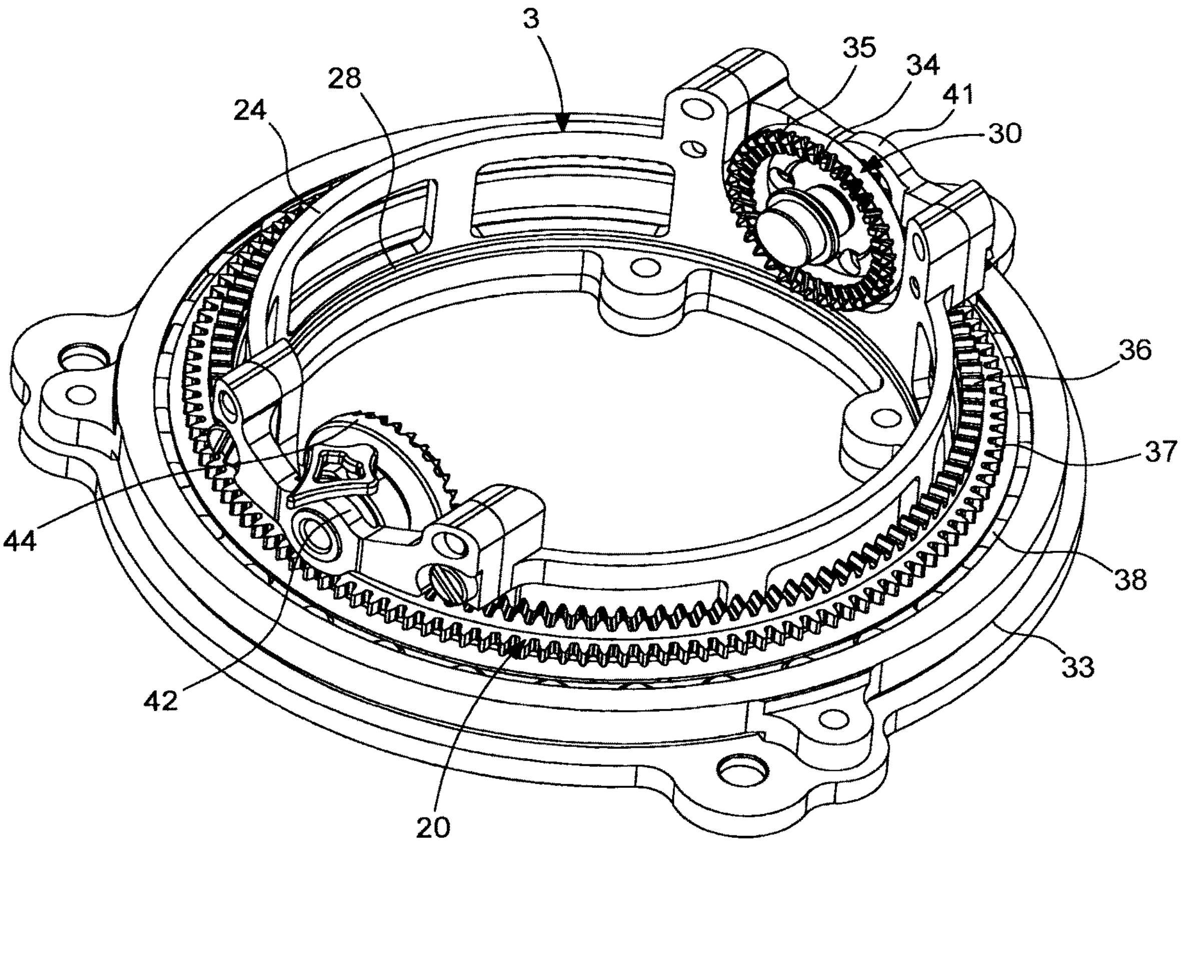

The movement 10, shown in part in FIGS. 1 and 2, further includes drive means 15 comprising a barrel 7 and a gear train 13 for actuating the motion of the hands (not shown) and for transmitting the driving force provided by the spring of the barrel 7 to the three-dimensional karussel 1.

The three-dimensional karussel 1 is a regulating member provided with an inertial mass 6, a guide and an elastic return element 4 of the inertial mass 6 configured to make it oscillate substantially in a plane. The three-dimensional karussel further comprises an escapement mechanism 5 that cooperates with the inertial mass 6. The elastic return element 4 is, for example, a balance spring and the inertial mass 6 is an annular balance associated with the balance spring in order to perform an oscillatory motion. The escapement mechanism 5 is, for example, a conventional escapement mechanism comprising an escape wheel 25, a pallet-lever 26 and an intermediate wheel 19. The escape wheel 25 cooperates with the pallet-lever 26 to rotate intermittently at a predefined frequency. The pallet-lever 26 is capable of moving thanks to the motion of the balance wheel and the impulses of the escape wheel 25.

In the description below, the drive means 15 refer to the parts for supplying and transmitting the energy required by the three-dimensional karussel 1 to operate.

The invention does not specifically relate to the intrinsic features and operation of a simple karussel, which are known to a person skilled in the art.

FIGS. 1 to 8 in particular show a three-dimensional karussel 1. The three-dimensional karussel 1 includes an inner carriage 2, inside which are arranged the mechanical resonator with the inertial mass 6, the guide and the elastic return element 4, as well as a Swiss lever 26 escapement mechanism 5.

The inner carriage 2 comprises an upper support 8 and a lower support 9, which are assembled to an intermediate structure 57 by screws 11 inserted into posts 12, of which there are two for the upper support 8, and three for the lower support 9. The mechanical resonator provided with the inertial mass 6, the guide and the elastic return element 4 are suspended between the upper support 8 and the intermediate structure 57, whereas the escapement mechanism 5 is suspended between the intermediate structure 57 and the lower support 9.

The lower support 9 comprises a frame 14 with a plurality of segments 23 connected to one another to form joints supporting bearings and the posts 12 supporting the mechanism elements inside the inner carriage 2.

The inertial mass 6 is arranged on a first staff disposed inside the inner carriage 2. The first staff is substantially perpendicular to the plane of the inertial mass 6.

The balance is disposed in the upper part of the inner carriage 2 so that it is visible from the outside. The balance is configured to perform a rotary oscillatory motion about the first staff within the inner carriage 2 at a predetermined frequency.

To actuate the mechanical resonator, a second staff 17, substantially parallel with the first staff, is disposed inside the inner carriage. An intermediate wheel 19 is integral with the second staff 17. The intermediate wheel 19 meshes with an escape pinion 21 arranged on a third staff 22, which is substantially parallel to the first and second staffs 17. The third staff 22 is arranged inside the inner carriage 2. The third staff 22 also holds the escape wheel 25, which is disposed above the escape pinion 21. The escape wheel 25 cooperates with a Swiss lever 26 disposed perpendicularly to the periphery of the escape wheel 25. The pallet-lever 26 comprises an elongate body provided with a fork at a first end, the fork being configured to cooperate with a pin of the first staff, which cooperates with the movement of the balance. The second end of the pallet-lever 26 includes two pallets arranged to cooperate with the escape wheel 25, alternately blocking the rotation thereof, so as to cause it to rotate in steps. The pallet-lever 26 is carried by a fourth staff 27 arranged inside the inner carriage 2.

The inner carriage 2 is mounted such that it rotates about a first axis of rotation $D_1$ inside the outer carriage 3. The inner carriage 2 comprises two pivots 42, 43 each cooperating with a bearing 39, 41 of the outer carriage 3, the pivots 42, 43 being arranged along the axis of rotation $D_1$ of the inner carriage. Each bearing 39, 41 comprises a hole for inserting the pivot 42, 43. The two pivots 42, 43 can rotate inside each bearing 39, 41. Thus, the first axis of rotation $D_1$ of the inner carriage 2 passes through the outer carriage 3.

The outer carriage 3 comprises an annular upper part 24 and an annular lower part 28 rigidly connected to one another by posts 31. The upper part 24 carries the inner carriage 2 by means of the bearings 39, 41 arranged facing one another. The lower part 28 is provided with a peripheral outer toothing 32 for actuating the rotation of the outer carriage 3.

According to the invention, the three-dimensional karussel 1 comprises a first ball bearing 33 arranged to enable the outer carriage 3 to rotate. The first ball bearing 33 is, for example, pressed into the plate or into a plate bar (not shown in the figures). The first ball bearing 33 is arranged laterally around the lower part 28. The first ball bearing 33 comprises a ring that is fixed relative to the plate, which holds the balls against the lower part 28.

Thus, as the first ball bearing 33 is arranged at the periphery of the outer carriage 3, new configurations of the regulating member are possible. In particular, in this embodiment, a three-dimensional karussel 1 is obtained thanks to the disposition of this first ball bearing 33.

The outer carriage 3 is capable of moving in rotation about a second axis of rotation $D_2$. The inner carriage 2 and outer carriage 3 are actuated by the drive means 15 of the horological movement.

The rotation of the outer carriage 3 is produced in parallel with the rotation of the inner carriage 2 by the drive means 15. Moreover, the drive means 15 are configured to actuate the escapement mechanism 5 in parallel with the rotational motion of the outer carriage 3 and in parallel with the rotational motion of the inner carriage 2.

In order to actuate the carriages 2, 3 and the escapement mechanism 5, the three-dimensional karussel 1 includes a carriage driving wheel set 30 arranged and centred around the first axis of rotation $D_1$. The carriage driving wheel set 30 comprises a carriage driving pinion 34 and a carriage driving wheel 35. The carriage driving wheel set 30 is carried by the inner carriage 2. The carriage driving wheel set 30 is arranged around the pivot 42 of the inner carriage 2 internally close to the first bearing 39, between the inner carriage 2 and the outer carriage 3. The carriage driving pinion 34 is disposed towards the outside of the outer carriage 3, and the carriage driving wheel 35 is arranged towards the inside of the outer carriage 3. The carriage driving wheel set 30 is mounted such that it can rotate freely relative to the inner carriage 2 and to the outer carriage 3. In other words, the carriage driving wheel 35 and the carriage driving pinion 34 are not integral with the outer carriage 3 and the inner carriage 2. They can rotate freely, with the carriage driving pinion 34 and the carriage driving wheel 35 being integral with one another, in particular to rotate as one.

The carriage driving wheel 35 meshes with the intermediate wheel 19 of the escapement mechanism 5. Thus, the escape wheel 25, the pallet-lever 26 and the movement of the balance are actuated, via the intermediate wheel 19 and the escape pinion 21, which rotate the third staff 22. In order to actuate the escapement mechanism 5, the carriage driving pinion 34 is meshed.

For this purpose, the three-dimensional karussel 1 comprises a seconds driving crown 20 arranged such that it can rotate about itself around the second axis of rotation $D_2$ of the outer carriage 3, preferably around the outer carriage 3. The seconds driving crown 20 has a ring shape with a first upper toothing 36 and a second peripheral toothing 37. The first upper toothing 36 includes teeth that face upwards on the entire ring. The second peripheral toothing 37 includes teeth that face outwards around the entire ring.

When the seconds driving crown 20 rotates, the upper toothing 36 drives the carriage driving pinion 34, which is disposed outside the outer carriage 3. Thus, the seconds driving crown 20 drives the intermediate wheel 19 of the escapement mechanism 5 via the carriage driving wheel 35 of the carriage driving wheel set 30.

Alternatively, according to an alternative embodiment not shown, the seconds driving crown is arranged inside the outer carriage, preferably between the two carriages.

The three-dimensional karussel 1 comprises a second ball bearing 38 arranged to enable the seconds driving crown 20 to rotate. The second ball bearing 38 is arranged beneath the seconds driving crown along the entire ring. The second ball bearing is, for example, pressed into the plate or into a plate bar (not shown in the figures).

In this embodiment, the first ball bearing 33 and the second ball bearing 38 are superimposed, with the second ball bearing 38 arranged above the first ball bearing 33. The first ball bearing 33 comprising a first peripheral ring 55, and the second ball bearing 38 comprising a second peripheral ring 56, the second peripheral ring 56 being assembled with the first peripheral ring 55.

The seconds driving crown 20 is driven by the drive means 15 via gear trains of the gear system 13. Thus, by rotation of the seconds driving crown 20, the escapement mechanism 5 and the rotation of the inner carriage 2 and of the outer carriage 3 are actuated thanks to a torque provided by the drive means 15. The seconds driving crown 20 transmits the torque to the inner carriage 2 and outer carriage 3 and to the escapement mechanism 5.

A first part of the torque is transmitted to the outer carriage 3 in order to cause it to rotate about the second axis of rotation $D_2$, a second part of the torque is transmitted to the inner carriage 2 in order to cause it to rotate about the first axis of rotation $D_1$, and a third part of the torque is transmitted to the escapement mechanism 5 in order to actuate the escape wheel 25.

The first part of the torque is applied to the pivot 42 of the carriage driving wheel set 30 and causes the outer carriage 3 to rotate about the second axis of rotation $D_2$.

The second part of the torque is applied to the intermediate wheel 19 of the escapement mechanism 5 via the carriage driving wheel set 30 and causes the inner carriage 2 to rotate.

Thus, the drive means 15 are configured to actuate the rotational motion of the outer carriage 3 in parallel with the rotational motion of the inner carriage 2. However, the rotation of the outer carriage 3 is not inextricably linked to the rotation of the inner carriage 2. Thus, if the rotation of the inner carriage 2 is blocked, the outer carriage 3 can continue to rotate.

The third part of the torque is applied to the escape wheel 25 via the intermediate wheel 19 of the escapement mechanism 5 and the carriage driving wheel set 30. The intermediate wheel 19 thus pivots about itself and drives the escapement mechanism 5.

Thus, the drive means 15 are further configured to actuate the escapement mechanism 5 in parallel with the rotational motion of the outer carriage 3 and in parallel with the rotational motion of the inner carriage 2. More specifically, the intermediate wheel 19 distributes the torque to the escape wheel 25 on the one hand, and to a wheel 45 of first retaining gear trains 40 described hereinbelow, which restrain the rotation of the inner carriage 2. However, the rotation of the inner carriage 2 is not inextricably linked to the rotation of the escape wheel 25. Thus, if the escape wheel 25 is blocked, the inner carriage 2 can continue to rotate.

However, when the escape wheel 25 is blocked by the pallet-lever 26, the second and third parts of the torque are only transmitted to the inner carriage 2. More specifically, when the intermediate wheel 19 is blocked, the third part of the torque exerted on the escape wheel 25 is transferred at least partly to the inner carriage 2. In this case, such a configuration would cause the inner carriage 2 to rotate until the barrel 7 becomes completely recessed.

In order to control the rotational speed of the inner carriage 2, and to prevent it from rotating freely, the three-dimensional karussel 1 comprises first gear trains 40 for retaining the inner carriage 2, the first retaining gear trains 40 being arranged inside the inner carriage 2 so as to mesh with the intermediate wheel 19 of the escapement mechanism 5 and a wheel integral with the outer carriage 44. The wheel integral with the outer carriage 44 is capable of moving with the outer carriage 3. The wheel integral with the outer carriage 44 is mounted on the second bearing 41 of the outer carriage 3, so as to be centred and perpendicular to the first axis of rotation $D_1$.

The wheel integral with the outer carriage 44 is used to restrain the rotation of the inner carriage 2, and not to allow the inner carriage 2 to rotate as it would in a tourbillon.

The first retaining gear trains 40 comprise two wheel sets meshing with one another, a first wheel set 45 meshing with the intermediate wheel 19 of the escapement mechanism, and the second wheel set 46 meshing with the wheel integral with the outer carriage 44. The two wheel sets 45, 46 are each mounted on a different staff 53, 54, mounted within the inner carriage 2, between the intermediate structure 57 and the lower support 9.

The first retaining gear trains 40 prevent the inner carriage 2 from rotating freely. More specifically, the first retaining gear trains 40 are blocked by the intermediate wheel 19 of the escapement mechanism 5, which is retained by the escape wheel 25 blocked by the pallet-lever 26. However, they are configured to rotate at a predefined speed corresponding to the second part of the torque, when the escape wheel 25 is released from the pallet-lever 26. In such a case, the second wheel set 46 of the first retaining gear trains 40 rotates about the wheel integral with the outer carriage 44, and allows the inner carriage 2 to rotate about the first axis $D_1$.

When the escapement mechanism 5 is blocked by the pallet-lever 26, and the inner carriage 2 cannot rotate because of the first retaining gear trains 40, the entire torque is applied to the pivot 42 of the carriage driving wheel set 30. In this case, such a configuration would cause the outer carriage 3 to rotate until the barrel 7 becomes completely recessed.

To control the rotation of the outer carriage 3 and prevent it from rotating freely, the three-dimensional karussel 1 comprises second gear trains 50 for retaining the outer carriage 3. The second retaining gear trains 50 are arranged outside the outer carriage 3 so as to mesh with the seconds driving crown 20 and with the outer carriage 3.

The second retaining gear trains 50 comprise a first gear wheel 47 meshing with the second peripheral toothing of the seconds driving crown 20, and a second gear wheel 48 meshing with the outer peripheral toothing of the lower part of the outer carriage 3. The first gear wheel 47 and the second gear wheel 48 are connected by a connecting wheel set 49 provided with a pinion 51 and with a third gear wheel 52. The third gear wheel 52 meshes with the first gear wheel 47 and the pinion 51 meshes with the second gear wheel 48. The second retaining gear trains 50 prevent the outer carriage 3 from rotating faster than desired. The second retaining gear trains 50 connect the rotation of the outer carriage 3 with the seconds driving crown 20.

When the full torque is applied to the rotation of the outer carriage 3, the second retaining gear trains block the rotation of the outer carriage 3.

Thus, when the escape wheel 25 is alternately blocked by the pallet-lever 26, not only is the rotation of the inner carriage 2 momentarily blocked, but so is the rotation of the outer carriage 3.

When the first retaining gear trains 40 and the intermediate wheel 19 are blocked, the carriage driving wheel set 30 can no longer pivot about itself. Moreover, the second retaining gear trains 50 block the rotation of the outer carriage 3 as they prevent the seconds driving crown 20 from rotating.

One advantage of the three-dimensional karussel 1 according to the invention is that different rotational speeds can be easily selected and adjusted for the inner carriage 2 and outer carriage 3.

The rotational speed of the inner carriage 2 and outer carriage 3 depends on the size and number of teeth of the seconds driving crown 20, the carriage driving wheel set 30 and the first and second retaining gear trains 40, 50.

The rotational speed of the inner carriage 2 is determined by the first retaining gear trains 40 and by the rotational speed of the seconds driving wheel 20. The rotational speed of the outer carriage 3 is determined by the second retaining gear trains 50 and by the speed of the seconds driving wheel 20. It in particular depends on the number of teeth of the first retaining gear train 40 and second retaining gear train 50 for each carriage 2, 3 respectively.

In one specific example, the outer carriage 3 makes, for example, one revolution per minute, and the inner carriage 2 makes, for example, one and a half revolutions per minute, whereas the seconds driving crown 20 also makes one and a half revolutions per minute.

It goes without saying that the invention is not limited to the embodiment of the regulating member, in this case a three-dimensional karussel, described with reference to the figures and that alternatives can be considered without leaving the scope of the invention. For example, a three-dimensional tourbillon can include such a peripheral ball bearing on the outer carriage in order to rotate it about a single axis of rotation of the regulating member.

The invention claimed is:

1. A three-dimensional regulating member for a horological movement, the regulating member comprising:

a drive device provided with a barrel and a gear train, said regulating member including an inertial mass, an elastic return device for the inertial mass, an escapement mechanism, an inner carriage capable of moving in rotation about a first axis of rotation, and an outer carriage capable of moving in rotation about a second axis of rotation, the inner carriage being housed inside the outer carriage, the inner carriage carrying the inertial mass, the elastic return device for the inertial mass and the escapement mechanism, wherein the regulating member comprises a first ball bearing arranged to enable the outer carriage to rotate in the horological movement, with the first ball bearing being arranged at the periphery of the outer carriage, and wherein the regulating member is a three-dimensional karussel, the drive device being configured to actuate the rotational motion of the outer carriage in parallel with the rotational motion of the inner carriage such that a first part of a torque provided by the drive device being transmitted to the outer carriage and a second part of the torque being transmitted to the inner carriage.

2. The regulating member according to claim 1, with the drive device being further configured to actuate the escapement mechanism in parallel with the rotational motion of the outer carriage and in parallel with the rotational motion of the inner carriage, with a third part of the torque provided by the drive device being transmitted to the escapement mechanism.

3. The regulating member according to claim 1, wherein the drive device comprises a seconds driving crown arranged around the second axis of rotation of the outer carriage, the seconds driving crown being configured to transmit, in parallel, to the outer carriage and inner carriage, the first and second part of the torque provided by the drive device.

4. The regulating member according to claim 3, wherein the rotation of the seconds driving crown also causes the escapement mechanism to be actuated in parallel with the rotations of the outer carriage and of the inner carriage.

5. The regulating member according to claim 1, wherein the regulating member comprises a carriage driving wheel set carried by the outer carriage or the inner carriage, the carriage driving wheel set being free to rotate relative to the outer carriage and inner carriage, the rotation of the carriage driving wheel set actuating the escapement mechanism and the rotational motion of the inner carriage in parallel.

6. The regulating member according to claim 4, wherein the seconds driving crown meshes with the carriage driving wheel set.

7. The regulating member according to claim 5, with the escapement mechanism including an escape wheel, an escape pinion and an intermediate wheel meshing with the escape pinion, the carriage driving wheel set meshing with the intermediate wheel of the escapement mechanism.

8. The regulating member according to claim 7, wherein the regulating member comprises first gear trains for retaining the inner carriage, the first retaining gear trains being arranged within the inner carriage so as to mesh with the intermediate wheel of the escapement mechanism and a wheel integral with the outer carriage, in order to prevent the inner carriage from rotating at an excessive speed.

9. The regulating member according to claim 3, wherein the regulating member comprises second gear trains for retaining the outer carriage, the second retaining gear trains being arranged outside the outer carriage so as to mesh with the seconds driving crown and with the outer carriage, in order to prevent the outer carriage from rotating at an excessive speed.

10. The regulating member according to claim 9, wherein the seconds driving crown comprises two toothings, a first toothing meshing with the carriage driving wheel set, and a second toothing meshing with the second retaining gear trains.

11. The regulating member according to claim 3, wherein the regulating member comprises a second ball bearing arranged to enable the seconds driving crown to rotate.

12. The regulating member according to claim 1, wherein the outer carriage comprises an annular upper part and an annular lower part rigidly connected to one another, the annular upper part supporting the inner carriage by at least one bearing, the annular lower part being provided with an outer toothing.

13. The regulating member according to claim 1, wherein the inner carriage comprises an upper support and a lower support, with the inertial mass, the elastic return device for the inertial mass and the escapement mechanism being suspended between the upper support and the lower support.

14. The regulating member according to claim 1, wherein the rotational speed of the inner carriage is greater than the rotational speed of the outer carriage.

15. The regulating member according to claim 1, wherein the first axis of rotation is substantially perpendicular to the second axis of rotation.

16. The horological movement, comprising:

a plate and the regulating member according to claim 1.

17. The regulating member according to claim 5, wherein the carriage driving wheel set comprises a carriage driving pinion and a carriage driving wheel centered around the first axis of rotation.

18. The regulating member according to claim 5, wherein the drive device comprises a seconds driving crown arranged around the second axis of rotation of the outer carriage, the carriage driving wheel set comprises a carriage driving pinion and a carriage driving wheel centered around the first axis of rotation, the carriage driving pinion meshes with the seconds driving crown, the escapement mechanism includes an escape wheel, an escape pinion, and an intermediate wheel meshing with the escape pinion, and the carriage driving wheel meshes with the intermediate wheel of the escapement mechanism.

* * * * *